Patented Mar. 7, 1944

2,343,566

UNITED STATES PATENT OFFICE 2,343,566

VULCANIZATION OF RUBBER

Roger A. Mathes, Akron, Ohio, assignor to The B. F. Goodrich Company, New York, N. Y., a corporation of New York No Drawing. Application April 28, 1943, Serial No. 484,885

6 Claims. (Cl. 260—784)

This invention relates to the acceleration of the vulcanization of rubber, and pertains more specifically to acceleration by means of the reaction product of a 2-mercapto-oxazoline with formaldehyde and a primary or secondary amine.

The products of this reaction, it is believed, possess the following basic structure

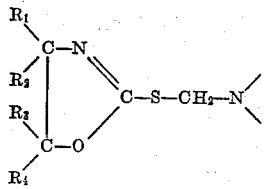

in which $R_1$, $R_2$, $R_3$, and $R_4$ are members of the class consisting of hydrogen, hydrocarbon, and alkyl ether groups, and in which the terminal nitrogen atom is that of an amino group.

Among the 2-mercapto-oxazolines which may be used for the preparation of my new accelerators are 2-mercapto-oxazoline
2-mercapto-4-methyl oxazoline
2-mercapto-5-methyl oxazoline
2-mercapto-4-ethyl oxazoline
2-mercapto-5-ethyl oxazoline
2-mercapto-4,4-dimethyl oxazoline
2-mercapto-5,5-dimethyl oxazoline
2-mercapto-4,5-dimethyl oxazoline
2-mercapto-4-phenyl oxazoline
2-mercapto-4-methoxy oxazoline
2-mercapto-4,5-cyclotetramethylene oxazoline
2-mercapto-4-butyl oxazoline
2-mercapto-5-amyl oxazoline and the like For the purpose of reacting with the 2-mercapto-oxazoline and formaldehyde to form the accelerators of my invention there may be used any primary or secondary organic amine; that is, an amine having the structure

in which $R_5$ is a member of the class consisting of hydrogen, aliphatic, and aromatic groups and $R_6$ is a member of the class consisting of aliphatic and aromatic groups. If a primary amine be used in the reaction, either one or both of the amino hydrogens may be replaced by the grouping.

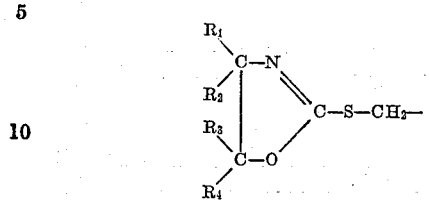

Polyamines may be used as well as monoamines; one or more of the amino groups in polyamines may enter into the reaction.

Among the amines which may be employed are methyl amine, dimethyl amine, ethyl amine, n-propyl amine, i-propyl amine, sec-butyl amine, cyclohexyl amine, aniline, N-methylaniline, o-toluidine, p-toluidine, 2,3-xylidine, 2,4-xylidine, diphenyl amine, ethylene diamine, propylene diamine, p-phenylenediamine, and other similar compounds. Similar amines containing nitro, hydroxy, halogen, or the like groups substituted on one or more of the carbon atoms may also be employed.

As specific examples of my invention I shall describe the preparation and use of two typical accelerators.

*Example I*

A mixture of 262 parts by weight of 2-mercapto-5,5-dimethyl oxazoline was heated slowly with 170 parts of a 37% aqueous solution of formaldehyde; at a temperature of about 50° C. a reaction occurred in which a light brown oil was produced. To the product was added 40 parts of ethyl alcohol as diluent and solvent. The temperature was lowered to about 25° C. and maintained at that level during the addition of a solution of 65 parts of isopropyl amine in 20 parts of ethyl alcohol. The reaction mixture was stirred vigorously during the addition of the amine, which required about one-half hour. A white precipitate formed immediately during the addition of the amine; after all of the amine had been added the stirring was continued for fifteen minutes longer, and the precipitate was then separated by filtration, washed with water, and dried. About 60 parts of a crystalline white solid, melting at 165 to 168° C., was obtained. An additional amount of product, somewhat less pure, was obtained by evaporation of the alcohol from the filtrate; the latter product melted at 154 to 157° C. and amounted to 197 parts by weight. It is believed that the mechanism of the reaction may be represented by the following equations:

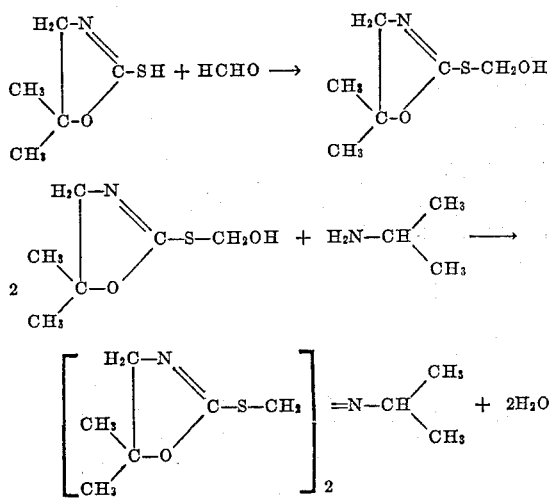

The product was incorporated in the following rubber composition, in which the parts are by weight:

| | |
|---|---:|
| Rubber | 100.0 |
| Zinc oxide | 5.0 |
| Sulfur | 3.0 |
| Lauric acid | 3.0 |
| Reaction product of Example I | 1.0 |

The composition did not vulcanize when heated at 220° F. for one hour, but when heated in a press at 287° F. resulted in a vulcanized product having the following properties:

| Time of vulcanization, in min. | Ultimate tensile strength in lb./sq. in. | Ultimate elongation, per cent |
|---|---|---|
| 15 | 2,710 | 1,020 |
| 30 | 2,820 | 890 |
| 60 | 3,400 | 700 |
| 90 | 2,930 | 750 |

*Example II*

A mixture of 197 parts of 2-mercapto-5,5-dimethyl oxazoline and 120 parts of a 37% aqueous solution of formaldehyde was heated to about 50° C., whereupon a reaction took place which yielded a light brown oil. To the reaction mixture was added about 40 parts of alcohol. The temperature of the mixture was held at 20 to 24° C. while a solution of 149 parts of cyclohexyl amine in 20 parts of alcohol was added, with stirring, over a 15 minute period. The alcohol was evaporated from the reaction mixture at room temperature over a period of several hours; the product, in the form of white crystals, was separated by filtration, washed, and dried. It melted at 164° C.

The following equations are believed to represent this reaction:

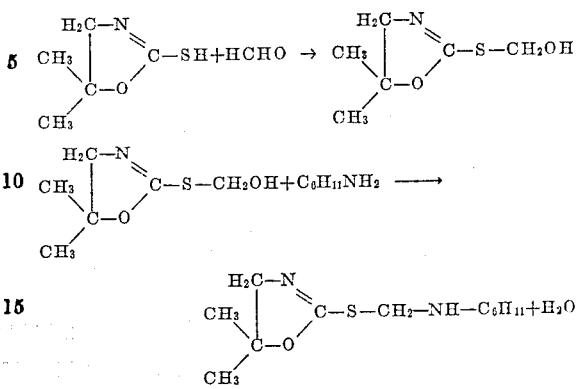

The accelerating effect of the material is shown by using it to replace the accelerator used in the rubber composition described in Example I. The properties of the composition, after vulcanizing at 287° F., are as follows:

| Time of vulcanization, in min. | Ultimate tensile strength, lb./sq. in. | Ultimate elongation, per cent |
|---|---|---|
| 15 | 2,380 | 990 |
| 30 | 3,220 | 900 |
| 60 | 3,370 | 800 |
| 90 | 3,400 | 810 |

The compounds of both examples are excellent accelerators, as is shown by the results of the tests on the rubber vulcanized with them. Other similar results may be obtained with other reaction products of 2-mercapto-oxazolines, formaldehyde, and amines.

The reaction by which these accelerators are prepared may be carried out at higher temperatures than those given in the specific example, and at elevated pressure, if desired. Water alone may be used as solvent instead of a mixture of water and alcohol, or the reaction may be carried out in the absence of solvent. In many cases an excess of the amine may be used as solvent.

The accelerators of my invention are effective in the vulcanization not only of natural rubber or caoutchouc, but also of reclaimed rubber, gutta percha, balata, latex, artificial rubber isomers, and those synthetic rubbers which can be vulcanized with sulfur, such as the copolymers of butadiene with styrene, acrylonitrile, or methyl acrylate, and the term "a rubber" as used in the claims is intended to designate all of the above-mentioned materials.

It is apparent that the accelerators herein described are applicable to rubber products of all descriptions. Such manufactures as pneumatic and solid tires, hose, belting, footwear, surgical rubber goods, all manner of molded goods, etc. may be vulcanized in the presence of these new accelerators.

Any of the usual pigments, fillers, reinforcing agents, softeners, antioxidants, other accelerators, etc., may also be used in conjunction with my accelerators without deleterious effect. The accelerators and other ingredients may be incorporated in the rubber mix by any of the usual methods, for example by means of a roll mill or internal mixer or the like.

Although I have herein described specific embodiments of my invention, I do not intend to limit myself solely thereto, but only to the extent indicated in the appended claims.

I claim:

1. The method which comprises vulcanizing a rubber in the presence of a compound having the structure

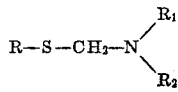

in which R is a 2-oxazolinyl group and in which $R_1$ is a member of the class consisting of hydrogen, aliphatic, and aromatic groups and $R_2$ is a member of the class consisting of aliphatic and aromatic groups.

2. The method which comprises vulcanizing a rubber in the presence of a compound having the structure R—S—CH₂—NH—(aliphatic) in which R is a 2-oxazolinyl group.

3. The method which comprises vulcanizing a rubber in the presence of cyclohexylaminomethyl 2-thio-oxazoline.

4. A composition comprising a rubber vulcanized in the presence of a compound having the structure

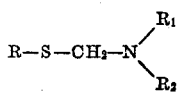

in which R is a 2-oxazolinyl group and in which $R_1$ is a member of the class consisting of hydrogen, aliphatic, and aromatic groups and $R_2$ is a member of the class consisting of aliphatic and aromatic groups.

5. A composition comprising a rubber vulcanized in the presence of a compound having the structure R—S—CH₂—NH—(aliphatic) in which R is a 2-oxazolinyl group.

6. A composition comprising a rubber vulcanized in the presence of cyclohexylaminomethyl 2-thio-oxazoline.

ROGER A. MATHES.